J. B. GOLDSBOROUGH.
HOLLOW CORE FOR USE IN MAKING CONCRETE PILES.
APPLICATION FILED AUG. 9, 1915.

1,236,556. Patented Aug. 14, 1917.

Witnesses:
John Waldheim
Thomas F. Schager

Inventor:
John B. Goldsborough.
by Henry D. Donnelly
Atty

J. B. GOLDSBOROUGH.
HOLLOW CORE FOR USE IN MAKING CONCRETE PILES.
APPLICATION FILED AUG. 9, 1915.

1,236,556.

Patented Aug. 14, 1917.
3 SHEETS—SHEET 2.

Witnesses:
John Waldheim
Thomas F. Schayer

Inventor:
John B. Goldsborough.
by Henry D. Donnelly
Atty

J. B. GOLDSBOROUGH.
HOLLOW CORE FOR USE IN MAKING CONCRETE PILES.
APPLICATION FILED AUG. 9, 1915.
1,236,556.
Patented Aug. 14, 1917.
3 SHEETS—SHEET 3.
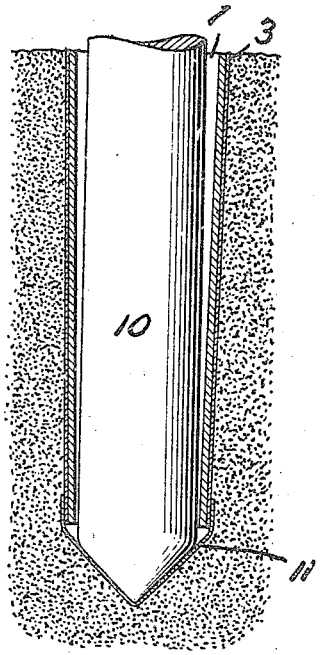
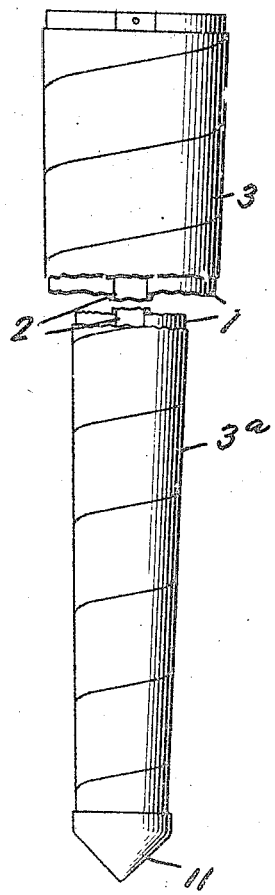
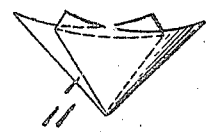
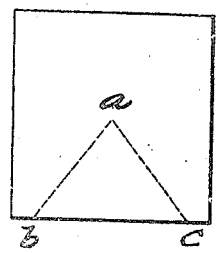
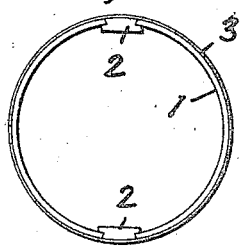
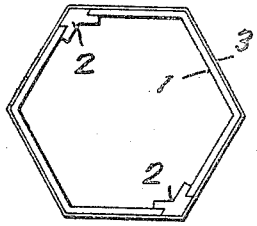
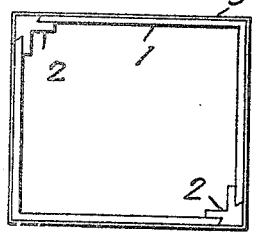
Witnesses:
John Waldheim
Thomas F. Schayer
Inventor:
John B. Goldsborough
by Henry D. Donnelly
Atty

UNITED STATES PATENT OFFICE.

JOHN B. GOLDSBOROUGH, OF CROTON-ON-HUDSON, NEW YORK.

HOLLOW CORE FOR USE IN MAKING CONCRETE PILES.

1,236,556. Specification of Letters Patent. Patented Aug. 14, 1917.

Application filed August 9, 1915. Serial No. 44,532.

*To all whom it may concern:*

Be it known that I, JOHN B. GOLDSBOROUGH, a citizen of the United States, and a resident of Croton-on-Hudson, Westchester county, New York, have invented a new and useful Hollow Core for Use in Making Concrete Piles, of which the following is a specification.

In the construction of made-in-place concrete piles the general process consists of making a hole by driving a preparatory pile or core. The core is then withdrawn and the hole filled with concrete. Many of these piles fail, due to the collapsing of the hole or the intermixing of the concrete with foreign material. To overcome this the hole is sometimes lined with a thin sheet metal casing. In order to protect the hole against water, earth pressure, and the vibration and back-pressure due to driving adjacent piles, it is necessary to make this casing very heavy. In fact, to really accomplish this purpose it would be necessary to make the casing so heavy and expensive that the cost would overbalance the benefit. Even with some of the later types of expensive reinforced casing it is not considered safe to drive piles closer together than 12 feet. This requirement of wide spacing of piles makes it necessary to wait until the concrete has set and then go over the ground a second, or even a third, time and put in the necessary intermediate piles.

In order to overcome these difficulties I provide a special readily removable collapsible and expansible core, whereby the maintenance and protection of the hole is absolutely positive; whereby piles can be driven continuously and as close together as desired and yet, due to the peculiar nature of the core and of the process, very thin inexpensive casings can be used; and whereby an entirely free and unobstructed passage is provided through the interior of the collapsible core through which to conduct various operations, and more particularly the introduction of the pile-forming material itself. To this end the core is of hollow or tubular formation with a key-way in its wall, wherein is inserted a taper key, which not only leaves the interior of the core open but is also so constructed and arranged as to give rise to no projection beyond the core's outer surface, so that its use does not interfere with the placing of the casing. In addition to the foregoing, the present system possesses various novel features and advantages, which will become apparent as the specification proceeds.

In the accompanying drawings illustrating the invention:

Fig. 8 is a longitudinal section illustrating a rammer and end cap used in conjunction with the core and casing;

Fig. 9 is an interrupted side elevation of a core with casing and end cap, the casing being shown as of spiral formation;

Fig. 10 is a side view of a form of sheet metal end cap;

Fig. 11 is a plan view of the blank from which the cap is made, indicating with dotted lines the manner of folding; and Figs. 12, 13 and 14 are outline views showing different cross-sections of cores and also illustrating the fact that more than one key may be used.

Figure 1:
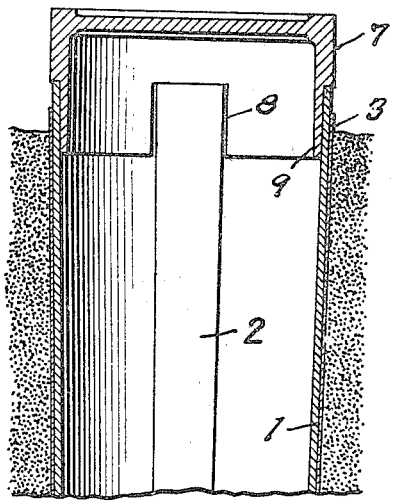
Figure 1 is an interrupted longitudinal section showing the collapsible tubular heavy-walled pile core with a closed driving point and a surrounding thin-walled casing driven into the earth, the driving head being shown on top of the core.
Figure 1:
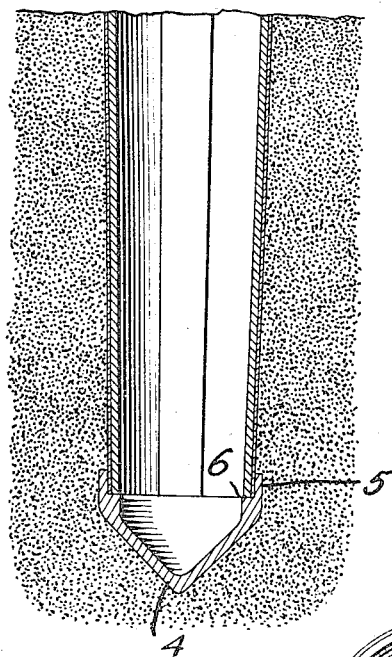

The collapsible core 1 comprises a heavy-walled tube, either tapering or straight, and of either circular or angular cross-section. As clearly illustrated in the various figures of the drawing, the adjacent edges of the walls of tube are provided with a longitudinal tapering key-way, in which is fitted a correspondingly tapered key 2, which is preferably of the form shown or which may be of other suitable nature. The core is expanded or contracted by driving home or partially withdrawing this key. The key-way extends from end to end of the core and when the key is driven home, so as fully to expand the core, its upper end is flush with the upper end of the core. Important features of this key are that it leaves the interior of the core open and that it does not project or necessitate any projections beyond the core's outer surface. Upon partially or completely withdrawing the key, the core can contract so as to be freely removable from the hole or from the surrounding casing. As shown in Figs. 12, 13 and 14, the core may have more than one keyway and key, and may also be of non-circular cross-section.

In general use, a sheet metal casing 3 is drawn on over the core before the latter has been fully expanded. A cast point 4 is then placed over the lower end, the said point having an outside flange 5 lapping over the lower edge of the casing and a shoulder 6 bearing firmly against the lower end of the core. A removable cast steel driving head 7 is entered in the top of the core, a proper recess 8 being provided in the side of the driving head so that it will clear the upper end of the taper key. The assembled parts are now driven into the ground by means of a pile hammer in the usual manner, or by other suitable means, and when driven occupy the position shown in Fig. 1. The driving head is removed and the next core driven immediately in a similar manner; and the work of the pile driving rig is carried on continuously and efficiently, the cores being left temporarily in the holes. These cores are inexpensive and a number of them are provided for one contract. The leaving of the core temporarily in the ground positively protects the hole from all damage or from vibration and back pressure, due to driving additional piles in the immediate vicinity.

Figure 2:
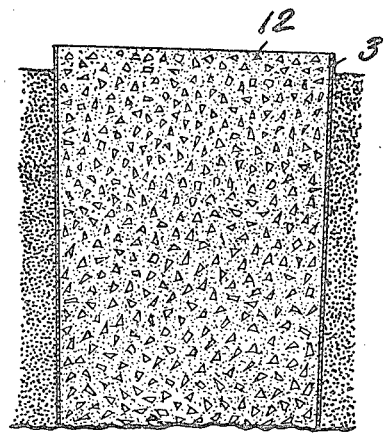
Fig. 2 is a similar view of the completed pile, the core having been removed.
Figure 2:
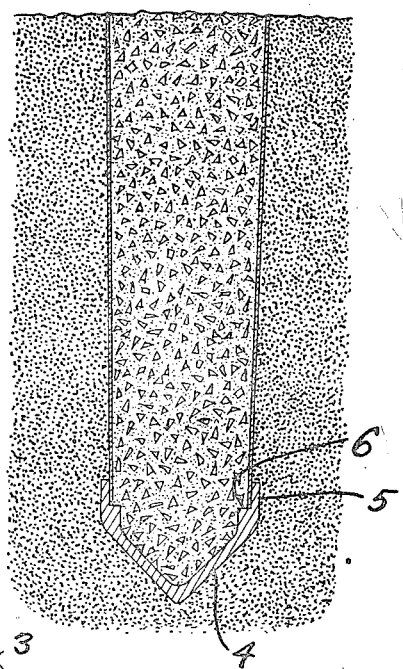
Figure 3:
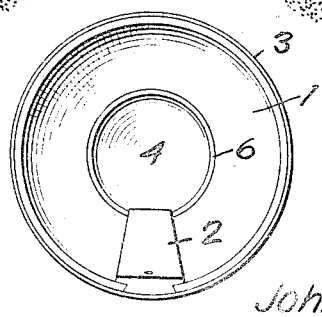
Fig. 3 is a top plan view of the core.
Figure 4:
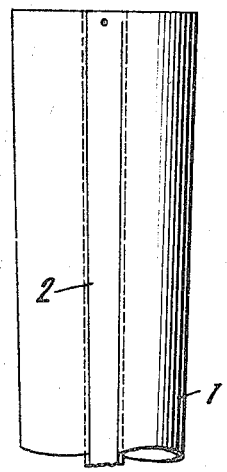
Fig. 4 is an interrupted side elevation of a tapering core.
Figure 5:
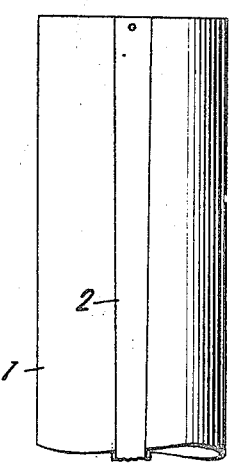
Fig. 5 is a similar view of a cylindrical core.

As soon as the pile driving work has progressed a sufficient distance from this first pile, the core is collapsed by means of partially withdrawing the long taper key, when the core is readily and easily removed, leaving the sheet metal casing and cast point permanently in the ground, as shown in Fig. 2. The hole can be filled with concrete 12 either immediately before, during the withdrawing process, or immediately afterward. It is most desirable, however, to introduce the concrete simultaneously with or before the removal of the core, since in this way the thin-walled casing is at all times supported and there is consequently no danger of collapsing; and it is an important advantage of the invention that the collapsible core permits of this manner of conducting the operation. Reinforcements can also be introduced in the interior of the core, prior to the filling in of the concrete, and the interior of the core may also be used for the passage of jet pipes for the purpose of sinking by jetting in the known manner.

Figure 6:
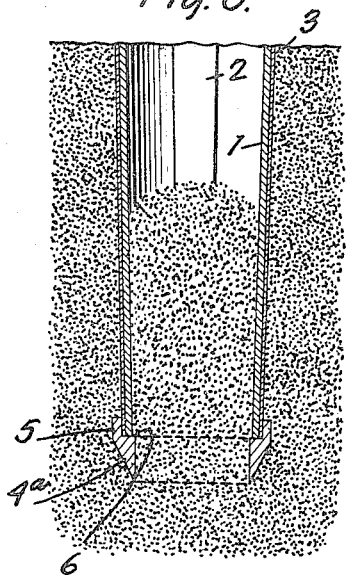
Fig. 6 is a longitudinal section through the lower portion of the core driven open-ended, with a casing.
Figure 7:
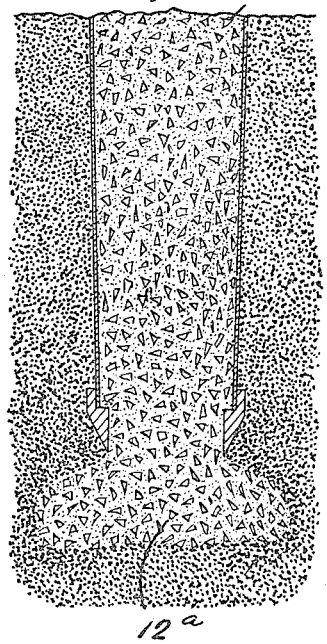
Fig. 7 is a similar view showing a pile with enlarged footing which may be formed after removing the material from the interior of Fig. 6.

Should there be unusually hard material to penetrate, the closed point can be left off and the assembled parts driven with an open-ended core, the edge of which may be reinforced by an annular point $4^a$ (Figs. 6 and 7.) In this case, a certain amount of material will come up inside of the core as represented in Fig. 6, and this must, of course, be cleaned out or blown out before filling the hole with concrete. Should it be desirable to compress the soil at the point of the pile or provide a spread base $12^a$ for better bearing, this can be done by leaving the core temporarily in place, partly filling the hole with concrete and bringing into use a plunger or rammer (not shown). The core protects the upper portion of the hole during this process and the enlargement resulting from the blows of the plunger takes place only in the vicinity of the point of the pile. After the base has been sufficiently enlarged in this way, the core may be collapsed and removed and the balance of the hole filled with concrete, as shown in Fig. 7. Under certain circumstances the core may be driven without a casing.

When driving the core in the ground the driving head rests on top of the core and holds the key in place, and thus prevents the core collapsing during the driving process. The long inside flange 9 of the head sustains the core during driving and prevents, to a large extent, disturbing lateral vibration. The shoulder on the driving head communicates the force of the hammer blow to the entire circumference of the upper end of the core and also protects it from damage. The driving head is readily removable and can be taken with the pile hammer to the next pile immediately after the first core is driven.

The core and key together resemble a simple pipe, the interior of which is entirely open, so that when in use it lends itself to many advantageous operations. When used with a closed point, jetting can be resorted to if desired. Also concrete can be poured in while the core is in place or while the core is being removed. Likewise, when driven open-ended, it allows of the material inside of the pipe being removed without any hindrance and protects the sides of the hole during the process. The combination of parts of core, casing, point and driving head (as shown in Fig. 1) has many features peculiar to itself. The metal point strengthens the end of the core against the shock of driving. It overlaps the lower edge of the sheet metal casing and prevents the latter from being rolled up or torn by the friction of the penetrated earth. It also makes a tight joint with this casing, so that the hole is watertight even after the core is removed. As the flange of the point laps over the outside of the core it does not in any way interfere with the key or its operation; neither does it interfere with the collapsing of the core.

The core and casing can be placed without the use and expense of a cast point by using a pointed spud or plunger 10, as shown in Fig. 8. It is often advisable when making a pile with the use of a pointed spud to have the bottom of the hole protected by means of a sheet metal cap 11, in order to keep out water and other foreign material. This sheet metal cap can be stamped or it can be made by folding a square piece of sheet metal, as shown in Figs. 10 and 11. The sheet is folded along the lines $b-a$ and $c-a$ of Fig. 11 and then folded up as shown in Fig. 10. When the sheet metal cap is in position the pressure of the material being penetrated will press the outer edge of the cap firmly against the casing, making a tight joint with the same. Also if it is desired to produce a spread footing on a pile where one of these caps is utilized, the cap in no way interferes with the operation, being merely pushed off the end of the casing and flattened out beneath the spread foot.

As shown in Fig. 9 a casing $3^a$ of spiral formation may be employed instead of a simple tubular casing.

What I claim as new is:

1. A hollow, collapsible and expansible tubular pile core for use with a sheet metal casing, having a smooth exterior and an unobstructed interior and a longitudinal slot-like keyway in its wall, and a longitudinal key guided and confined in said keyway, said key being a narrow tapered strip substantially flush with the exterior of the core and leaving the interior of the core open and unobstructed.

2. A hollow, collapsible and expansible tubular pile core for use with a sheet metal casing, having a smooth exterior and an unobstructed interior and a longitudinal slot-like keyway in its wall, and a longitudinal tapered key, guided and confined in said keyway, said key being flush with the exterior and leaving the interior open, and having grooves in its side edges engaging the edges of the wall of the core constituting the boundaries of the slot.

3. The combination of a sheet metal pile casing, and a collapsible and expansible tubular pile core having a smooth exterior and an unobstructed interior and a longitudinal slot-like keyway in its wall, and a tapered key in said keyway substantially flush with the exterior of the core and projecting only slightly into the interior.

4. The combination of a collapsible and expansible tubular core having a smooth exterior and an unobstructed interior and a longitudinal slot-like keyway in its wall, a longitudinal tapered key in said keyway substantially flush with the exterior of the core and projecting only slightly into the interior thereof, a shell surrounding the core and key, and a driving point applied to the end of the core and having an upward extending annular flange encircling the lower end of the core and shell.

5. The combination of a collapsible and expansible tubular core having a smooth exterior and an unobstructed interior and a longitudinal slot-like keyway in the edges of its wall, a longitudinal tapered key in said keyway substantially flush with the exterior of the core and projecting only slightly into the interior thereof, a shell surrounding the core and key, a driving head having a depending flange inserted in the upper end of the core and a shoulder to bear upon the top thereof, and a slot in said flange to accommodate the upper end of the key.

In testimony whereof, I have signed my name to this specification, in the presence of two subscribing witnesses.

JOHN B. GOLDSBOROUGH.

Witnesses:
    JULES R. BRUCHAUD,
    FRANCIS L. PANYN.